Feb. 12, 1952 L. G. MARTIN 2,585,481
VEHICLE ACTUATED GATE
Filed June 13, 1946 2 SHEETS—SHEET 1
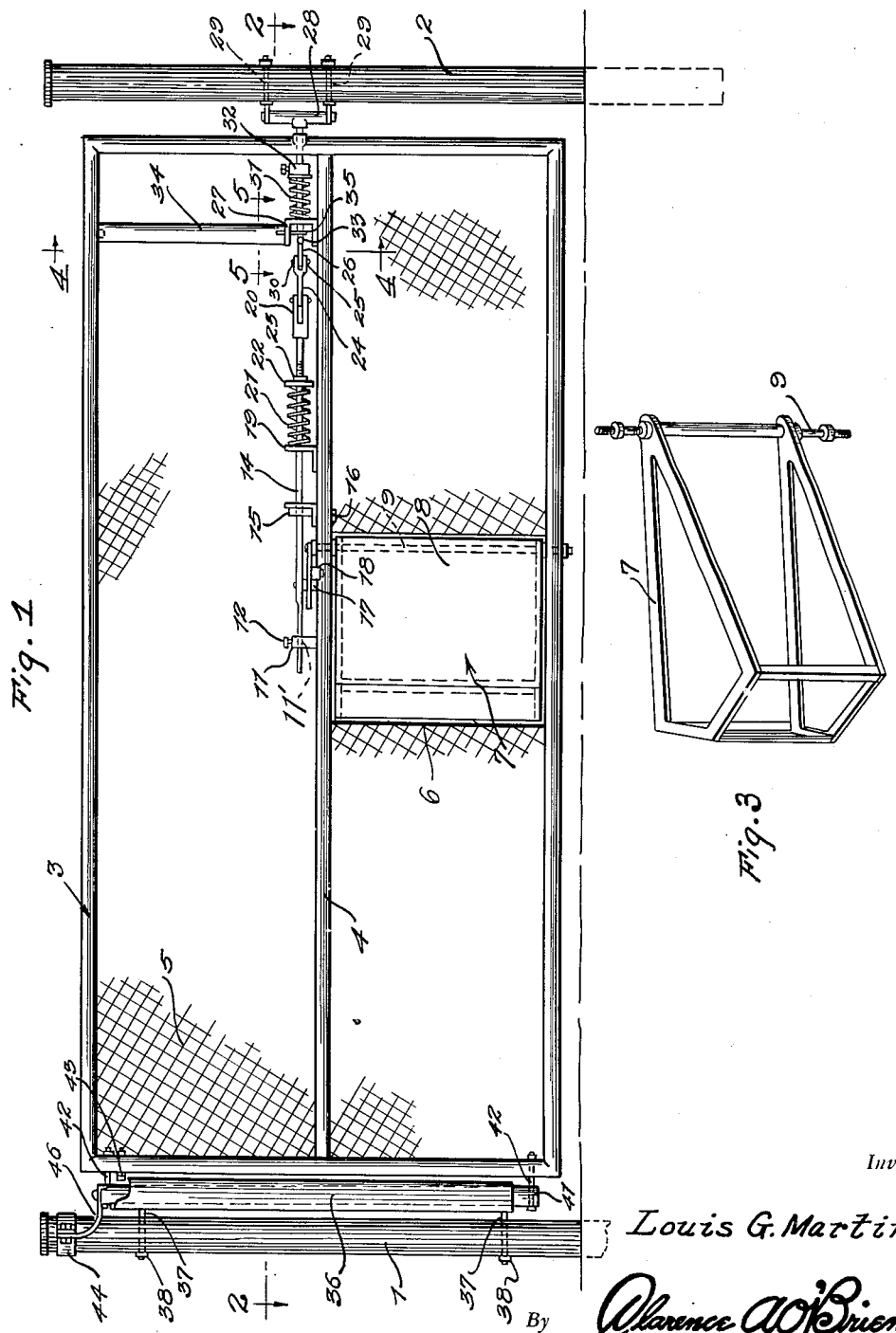
Inventor
Louis G. Martin
By Clarence A. O'Brien
and Harvey B. Jacobson
Attorneys Feb. 12, 1952  L. G. MARTIN  2,585,481
VEHICLE ACTUATED GATE
Filed June 13, 1946  2 SHEETS—SHEET 2
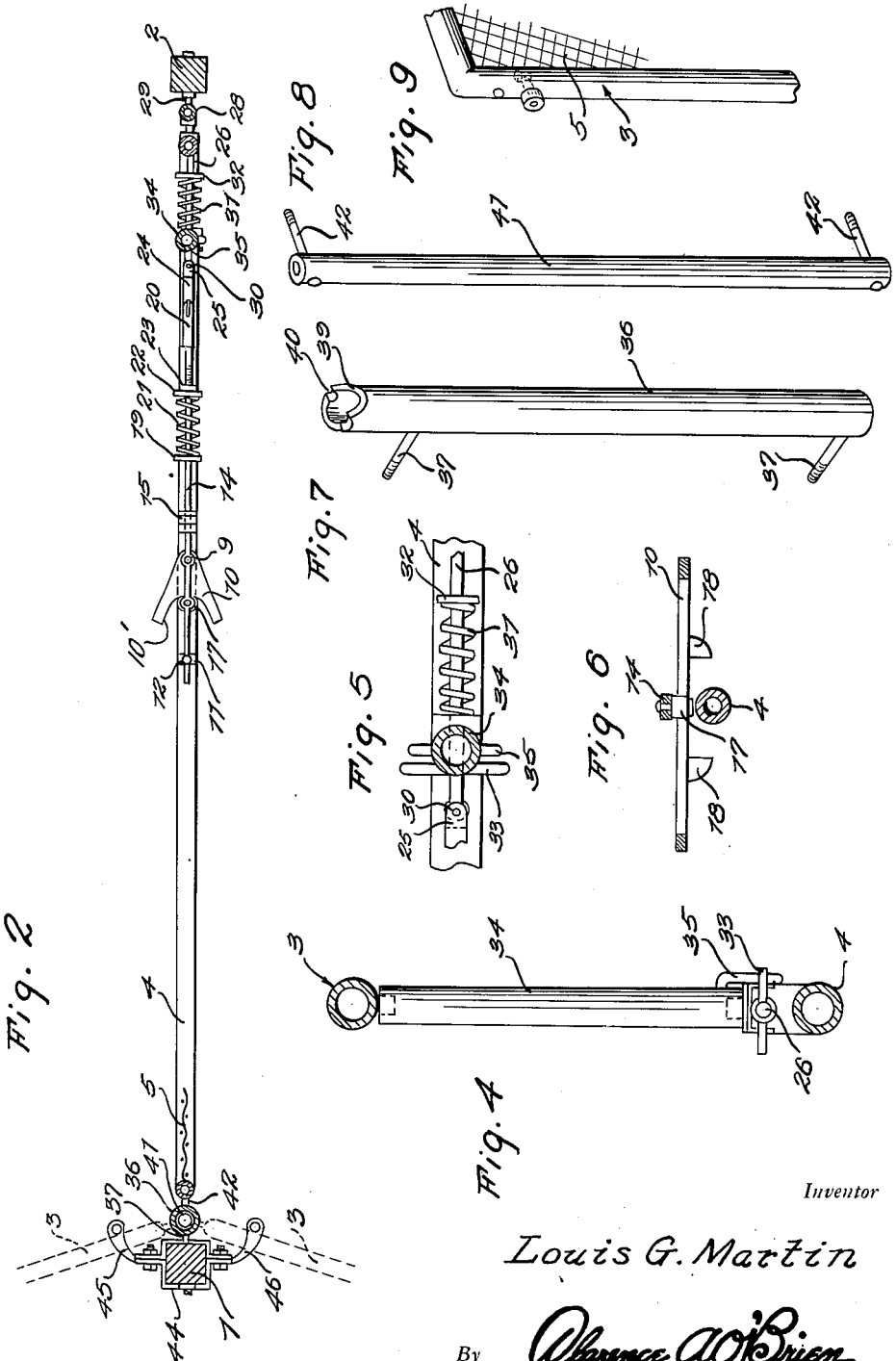
Inventor
Louis G. Martin Patented Feb. 12, 1952

2,585,481

UNITED STATES PATENT OFFICE 2,585,481

VEHICLE ACTUATED GATE

Louis G. Martin, San Antonio, Tex.

Application June 13, 1946, Serial No. 676,467

2 Claims. (Cl. 39—37)

This invention relates to improvements in gates.

An object of the invention is to provide an improved gate construction which will include a latch release mechanism adapted to be engaged by the bumper of an automobile for unlatching the gate and opening the same so that the automobile may pass therethrough without the driver having to get out to manually unlatch and open the gate.

Another object of the invention is to provide an improved self-closing gate construction which may be unlatched and opened when a latch release mechanism is engaged by the bumper of an automobile, or said latch may be manually released by a pedestrian by operating a hand release operator.

A further object of the invention is to provide an improved horizontal swinging gate for use especially on ranches and farms, said gate having releasing means either manually operable or adapted to be operated by the bumper of an automobile, together with means for automatically closing said gate after the same has been passed through.

Another object of the invention is to provide an improved gate with releasing and opening means adapted to be engaged by the bumper of an automobile, together with means for cushioning the back swing of the gate when swung open too hard, and means for either holding the gate in open position or for automatically closing the same.

Another object of the invention is to provide an improved gate construction which will be highly efficient in operation and relatively inexpensive to manufacture and produce.

Other objects will appear as the description proceeds.

In the accompanying drawings which form a part of this application:

Figure 1 is a side elevation of the improved gate shown in position between two gate posts;

Figure 2 is a partial sectional view taken on the line 2—2 of Figure 1;

Figure 3 is an enlarged perspective view of the pivoted bumper engaging latch release operator with the cover removed;

Figure 4 is a view taken on the line 4—4 of Figure 1;

Figure 5 is a view taken on the line 5—5 of Figure 1;

Figure 6 is an enlarged end view looking into the roller and cam latch releasing mechanism;

Figure 7 is a perspective view of the outer tubular hinge member adapted to be supported upon a gate post;

Figure 8 is a perspective view of the inner tubular hinge member for securing to and supporting the gate, and Figure 9 is a detail view in perspective of the inner and upper corner of the gate frame showing the gate closure roller in position thereon.

Like characters of reference are used throughout the following specification and the accompanying drawings to designate corresponding parts.

In carrying out the invention, there is provided a gate construction including the spaced gate posts 1 and 2, and a gate frame generally denoted by the reference numeral 3 having a cross rail or pipe 4 and being filled in by the wire mesh 5. The lower central portion of the gate frame 3 will be apertured as at 6, for purposes hereinafter described.

A bumper latch release operator 7 of substantially triangular skeleton, lever form, and covered with a sheet metal cover or casing 8 is fixed at one end thereof to a vertical rock shaft 9 pivotally mounted in the cross rail or pipe 4 and the lower rail of the gate frame 3 to extend through the opening 6 at one side thereof and support said operator 7 in said opening 6 for horizontal swinging movement in opposite directions from an intermediate position through engagement therewith of the bumper of an automobile, not shown, approaching opposite sides of said gate. As will be clear, swinging of said frame 7 in opposite directions will rock said shaft 9 in opposite directions.

A forked cam 10 forming a V-notch 10' is fixed at one end to the upper end of the shaft 9 and extends horizontally in spaced relation above the cross pipe or rail 4 of the gate 3, the notch 10' of the cam opening towards the hinged end of the gate and said cam being swingable in opposite directions by rocking of said rock shaft 9 in opposite directions.

An alignment rack 11 having an adjusting set screw 12 is secured to and extends above the pipe or rail 4 and is adapted to receive the guide rod 14 which extends through the horizontal opening 11' formed in said rack and continues toward the free end of the gate, to extend through the apertured rod guide 15 secured by the bolt 16 to the pipe or rail 4 at the opposite side of the cam 10.

A roller 17 is supported by the guide rod 14 below the same and is straddled by the V-notch 10' of said cam 10 to be engaged by opposite sides of said notch 10' and be cammed by opposite sides of said notch 10' to retract the rod 14 longitudinally of the gate when the latch releasing operator 7 is swung oppositely by an automobile bumper. Retraction of said rod 14 retracts a spring tensioned latch bar 26, by means presently described, to unlatch said gate. Stops 18 will be formed on the cam arm to limit the movement thereof, as best illustrated in Figure 6 of the drawings. The set screw 12 provides for taking up wear on said rod 14.

A second apertured rod guide 19 is secured to the pipe or rail 4 and supports the forward end of the rod 14 which supports a yoke or clevis 20 on its extreme forward end. A heavy tension spring 21 is mounted about the rod 14 adjacent the guide 19 and is variably tensioned by means of the washer 22 and the adjusting nut 23 on said rod 14 to variably tension said rod 14.

The link 24 is pivoted between the yoke or clevis 20 and is in turn, formed with the yoke or clevis 25 on its opposite end. The gate latch bar 26 extends through the U-shaped guide member 27 and through an aperture in the outer end frame member or pipe of the gate 3 to be received in the socket of a vertically positioned latch keeper 28 secured to the gate post 2 by means of the bolts 29. The inner end of the latch bar 26 will be connected between the yoke or clevis 25 by the pin 30, and a weaker coil tensioning spring 31 will be positioned over the bar 26 and adjustably tensioned by the adjusting collar 32.

The transversely extending pin 33 will be suitably secured to the latch bar 26, preferably by welding, and will cooperate with the rotatable hand operator member 34 supported between the upper bar or pipe of the gate frame 3 and the upper surface of the guide member 27. One or more depending pins 35 will be secured to the lower portion of the member 34 and will engage the pin 33 on the latch bar 26 to retract the same from its keeper 28 when the hand operator member 34 is rotated.

Thus, it will be seen that the gate may be unlatched and pushed open by the bumper of an automobile engaging the bumper latch release operator 7, or by manually rotating the hand operator member 34.

The hinge for the gate 3 comprises a vertical tubular housing 36 having attaching bolts 37 extending outwardly therefrom for extending through the gate post 1, to be held in position thereto by the nuts 38. The upper end of the housing 36 will be cut off at an angle as at 39 to form a cam surface, and will be further provided with the opposed notches 40, whose purpose will be hereinafter described.

An inner tubular hinge member 41 will be snugly received in the housing 36 and will extend above and below the same, and will be provided with the supporting bolts 42 for extending through the hinged end of the gate 3.

A roller 43 will be mounted on the upper end of the adjacent end of the gate 3, and will be adapted to engage the cam surface 39 and to roll up the inclined cam surface when the gate is open, thus lifting the gate and the inner hinge member 41 above and off its normal seat in the housing 36. The weight of the gate will cause the roller 43 to roll down its inclined cam surface to cause the same to automatically close, after the gate has reached its open position. If it is desired to hold the gate open, it will be opened until the roller 43 seats in either of the notches 40, thus retaining the same in open position until the roller is again started down its inclined cam surface, which will automatically close the gate.

A spring shock absorbing member 44 is secured about the upper end of the gate post 1, and is formed with the depending arms 45 and 46 which will be engaged by the upper rail or pipe of the gate 3 should the same be opened too far or too violently, thereby cushioning the shock on said post.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In a horizontally swingable gate, spring-loaded latch means for holding the gate closed including a horizontal rod mounted on said gate and endwise movable for retraction to unlatch the gate, a vertical rock shaft journaled in said gate for rocking in opposite directions, a lever member fast on said shaft and projecting radially therefrom for swinging laterally in opposite directions from an intermediate position by impact of an automobile bumper against opposite sides of said member whereby to rock said shaft, and means for retracting said rod by rocking of said shaft in opposite directions, comprising a horizontal forked cam forming a V-notch and fast on one end of said shaft, and a roller fast on said rod and straddled by said notch for camming by opposite sides of said notch upon swinging of said member in opposite directions.

2. In a horizontally swingable gate, latch means for holding the gate closed including a horizontal rod mounted on said gate and endwise movable for retraction to unlatch the gate, a vertical rock shaft journaled in said gate for rocking in opposite directions, a lever member fast on said shaft and projecting radially therefrom for swinging laterally in opposite directions from an intermediate position by impact of an automobile bumper against opposite sides of said member whereby to rock said shaft, and means for retracting said rod by rocking of said shaft in opposite directions comprising a horizontal forked cam forming a V-notch and fast on one end of said shaft, and a roller fast on said rod and straddled by said notch for camming by opposite sides of said notches upon swinging of said member in opposite directions, said rod, being spring-tensioned to hold said roller in the bottom of said notch for yieldingly maintaining cam, rod and said member in an intermediate normal position for operation of said member from either side of the gate when the gate is closed, and means for causing the gate to normally swing closed.

LOUIS G. MARTIN.

REFERENCES CITED

The following references are of record in the file of this patent:

UNITED STATES PATENTS

| Number | Name | Date |
|---|---|---|
| 1,140,216 | Troutman | May 18, 1915 |
| 1,609,369 | Laird | Dec. 7, 1926 |
| 1,798,699 | Ralston | Mar. 31, 1931 |
| 2,076,092 | Pinard | Apr. 6, 1937 |
| 2,118,722 | Bock | May 24, 1938 |

FOREIGN PATENTS

| Number | Country | Date |
|---|---|---|
| 57,062 | Norway | Sept. 28, 1936 |